(12) United States Patent
Dadd (10) Patent No.: US 7,247,957 B2
(45) Date of Patent: Jul. 24, 2007

(54) ELECTROMECHANICAL TRANSDUCER LINEAR COMPRESSOR AND RADIO TRANSMISSION ANTENNA

(75) Inventor: Michael William Dadd, Oxford (GB)

(73) Assignee: ISIS Innovation Limited, Summertown Oxford (GB)

( * ) Notice: Subject to any disclaimer, the term of this patent is extended or adjusted under 35 U.S.C. 154(b) by 319 days.

(21) Appl. No.: 10/489,775

(22) PCT Filed: Sep. 18, 2002

(86) PCT No.: PCT/GB02/04274

§ 371 (c)(1),
(2), (4) Date: Sep. 3, 2004

(87) PCT Pub. No.: WO03/026107

PCT Pub. Date: Mar. 27, 2003

(65) Prior Publication Data

US 2005/0029874 A1    Feb. 10, 2005

(30) Foreign Application Priority Data

Sep. 20, 2001   (GB) .................................. 0122732.1

(51) Int. Cl.
    *H02K 41/00*    (2006.01)
(52) U.S. Cl. ........................................ 310/12; 318/135
(58) Field of Classification Search .................. 310/12,
    310/15, 156.02, 266, 268
    See application file for complete search history.

(56) References Cited

U.S. PATENT DOCUMENTS

| 3,707,924 | A | | 1/1973 | Barthalon et al. |
| 4,870,306 | A | * | 9/1989 | Petersen ........................ 310/12 |
| 6,043,579 | A | * | 3/2000 | Hill ............................. 310/164 |
| 6,256,198 | B1 | | 7/2001 | Larsson et al. |
| 6,326,706 | B1 | * | 12/2001 | Zhang ........................... 310/12 |
| 6,570,274 | B2 | * | 5/2003 | Kim et al. ..................... 310/12 |
| 2004/0150289 | A1 | * | 8/2004 | James .......................... 310/261 |

FOREIGN PATENT DOCUMENTS

| JP | 2001 090660 A | 4/2001 |
| WO | 99/27635 A | 6/1999 |

OTHER PUBLICATIONS

JPO translation of JP 2001-090660 (supplied by applicant).*
Patent Abstract of Japan, vol. 200, No. 21, Aug. 3, 2001, & JP 2001 090660 A, Apr. 3, 2001.

* cited by examiner

*Primary Examiner*—Burton S. Mullins
*Assistant Examiner*—Erik Preston
(74) *Attorney, Agent, or Firm*—Nixon & Vanderhye, PC (57) ABSTRACT

An electromagnetic transducer which may be driven as a linear electric motor (which may be a permanent magnet motor or a variable reluctance motor) in which coils disposed around first and second cores are positioned on opposite sides of a longitudinal plane in which the longitudinal axis of the armature lies. The transducer may be arranged to work as a generator.

32 Claims, 11 Drawing Sheets

ELECTROMECHANICAL TRANSDUCER LINEAR COMPRESSOR AND RADIO TRANSMISSION ANTENNA

This application is the US national phase of international application PCT/GB02/04274, filed in English on 18 Sep. 2002, which designated the US. PCT/GB02/04274 claims priority to GB Application No. 0122732.1 filed 20 Sep. 2001. The entire contents of these applications are incorporated herein by reference.

BACKGROUND AND SUMMARY

The present invention relates to electromechanical transducers, i.e. linear electric motors and linear electric generators. In particular, the invention relates to the electric motors which are used in linear compressors of refrigerators or coolers, for instance those used to cool radio transmission antennae, and to generators, such as those driven by Stirling engines.

The linear electric transducer of the present invention may be used as a motor in valveless compressors, particularly for driving stirling cycle coolers or pulse tube coolers, valved compressors, for instance domestic and industrial "Freon" type refrigerators, Gifford McMahon (GM) coolers and oil-free gas compressors, pumps in clean circulation systems, such as for medical purposes.

Linear motors previously used in these applications are not standard components that are then integrated with other components. In general they are custom designed. Because of the wide range of applications requiring linear motors there is already a range of motor designs tailored to particular requirements. These include moving coil, moving magnet and moving iron designs. Despite the range of existing motor designs there is a lack of a design that is truly suitable for large-scale low cost manufacture. This invention seeks to fill this gap.

Moving coil linear electric motors of the prior art require flexible current leads and a large amount of magnet material resulting in high cost of manufacture.

Moving magnet and moving iron linear electric motors of the prior art typically consist of a number of magnetic circuits formed by annular cores each having an air gap and an electric coil for creating a magnetic flux in the air gap. The air gaps are aligned along a direction of movement of an armature received into the air gaps. The armature may be iron or a permanent magnet or electromagnet. Such motors, though, generally suffer from a lack of robustness or complicated construction that is not very compatible with other aspects of linear machine technology.

The invention relates in particular to the geometry of the components of the electromechanical transducer, in particular cores for the coils which allow the magnetic circuits of the transducer to be closely positioned along the direction of movement of the armature.

According to the present invention there is provided an electromechanical transducer comprising:
  a first core providing a first flux path and defining a first air gap;
  at least one first stationary coil disposed around a portion of said first core;
  a second core providing a second flux path and defining a second air gap;
  at least one second stationary coil disposed around a portion of said second core; and
  a first armature arranged for linear motion along a longitudinal axis through said first and second air gaps; and
wherein
  said first and second air gaps are positioned adjacent one another in spaced apart relationship such that said longitudinal axis passes through said first and second air gaps; and
  said at least one first stationary coil and said at least one second stationary coil are positioned on opposite sides of a longitudinal plane in which said longitudinal axis lies.

There are several advantages derived from the positioning of the first and second stationary coils on opposite sides of a longitudinal plane in which the longitudinal axis of the armature lies. This geometry leads to the advantage that because the bulky first and second stationary coils can at least partly overlap in the direction of the longitudinal axis of the motor, the first and second air gaps can be positioned close together. The positioning of the air gaps close together in the longitudinal axis results in a more efficient use of the armature, lower moving mass and a more compact design. The provision of coils around first and second cores means that for permanent magnet and moving iron designs the armature does not need coils and flexible current leads are not required. The magnetic circuits in this invention have minimal unwanted air gaps and make more efficient use of magnet material than many linear electric motors of the prior art. Finally, the construction of such an electromechanical transducer is simpler than many of the electromechanical transducers of the prior art.

The flux paths in the cores are in a single plane (i.e. planar geometry) and thus it is possible to manufacture the cores of laminations which can easily be stamped out of sheet metal.

Preferably the first and second cores are positioned such that the first and second flux paths are substantially on opposite sides of the longitudinal plane.

In this way it is possible to further reduce the size of the electromechanical transducer, to minimise the distance between the first and second air gaps and maximise the shape of the cores for efficiency. Furthermore, with the cores positioned in that way the size of the first and second coils is not constrained by the need to keep the distance between the first and second air gaps small.

The armature may have a substantially rectangular cross-section so that the armature is particularly simple to construct offering lower cost of manufacture. If the armature is made of a permanent magnet, such geometry makes it easy to magnetise the armature in the correct direction. Alternatively, the armature may comprise at least one electromagnet with one or more coils and soft iron cores. Flexible current leads would be required to take current into the coils.

If the at least one first stationary coil comprises two stationary coils and the at least one second stationary coil comprises two stationary coils, both the first stationary coils and the second stationary coils can be arranged to give good use of space within a cylindrical housing.

Preferably the armature comprises a permanent magnet so the need for an armature comprising coils and the required flexible current leads is eliminated.

Advantageously the electromechanical transducer is a variable reluctance electric motor and the armature is comprised of a soft high magnetic permeability material and thus the need for expensive permanent magnetic material is eliminated.

The electromechanical transducer of the present invention may further comprise a third core for providing a third flux path and for defining a third air gap wherein the third air gap is positioned adjacent to the second air gap in spaced apart relationship and such that the longitudinal axis passes through the third air gap. In such a case the at least one first stationary coil may be disposed around a portion of the third core for generating a magnetic field across the third air gap.

Such an arrangement can be beneficial in that the length of travel of the armature in the linear electric motor may be increased.

Furthermore, the electromechanical transducer may comprise a fourth core for providing a fourth flux path and for defining a fourth air gap wherein the fourth air gap is positioned adjacent to the third air gap in spaced apart relationship and such that the longitudinal axis passes through said fourth air gap. In such a case the at least one second stationary coil may be disposed around a portion of the fourth core for generating a magnetic field across the fourth air gap and thus the length of travel of the armature of the electromechanical transducer may be still further be increased.

Alternatively with additional armature components the transducer power can be increased without increasing the transducer diameter.

Preferably the armature comprises a carriage comprising the first armature and a second armature separated by approximately the length of the second air gap in the direction of the longitudinal axis. This increases the total change in flux linkage and hence increases the power handling capacity. This increase in capacity can be achieved without increasing the motor diameter, the number of coils or the complexity of the control systems that provide current to the coils.

The first and second armatures may be permanent or electro-magnets or made of a soft high magnetically permeable material, the carriage may comprise a third armature which is a magnet, the third armature being polarised in the opposite direction to the first and second armatures and positioned between the first and second armatures. This further increases the power handling capacity of the linear electric transducer.

Of course any number of cores may be provided all connected in the same way as the first, second, third and fourth cores as described above.

The electromechanical transducer may be arranged to operate as a linear electric motor wherein said at least one first and second stationary coils are for generating magnetic fields across said first and second air gaps respectively and said first armature is arranged for linear motion in response to said generated magnetic fields.

The present invention also provides a linear compressor comprising such a linear electric motor.

The present invention also provides a refrigerator comprising such a linear compressor.

The electromechanical transducer may also be arranged to operate as a linear electric generator.

BRIEF DESCRIPTION OF THE DRAWINGS

The invention will now be described by way of examples only, with reference to the accompanying drawings, in which.

DETAILED DESCRIPTION OF EXAMPLE EMBODIMENTS

In the Figures, like reference numerals are used to indicate like parts.

Figure 1:
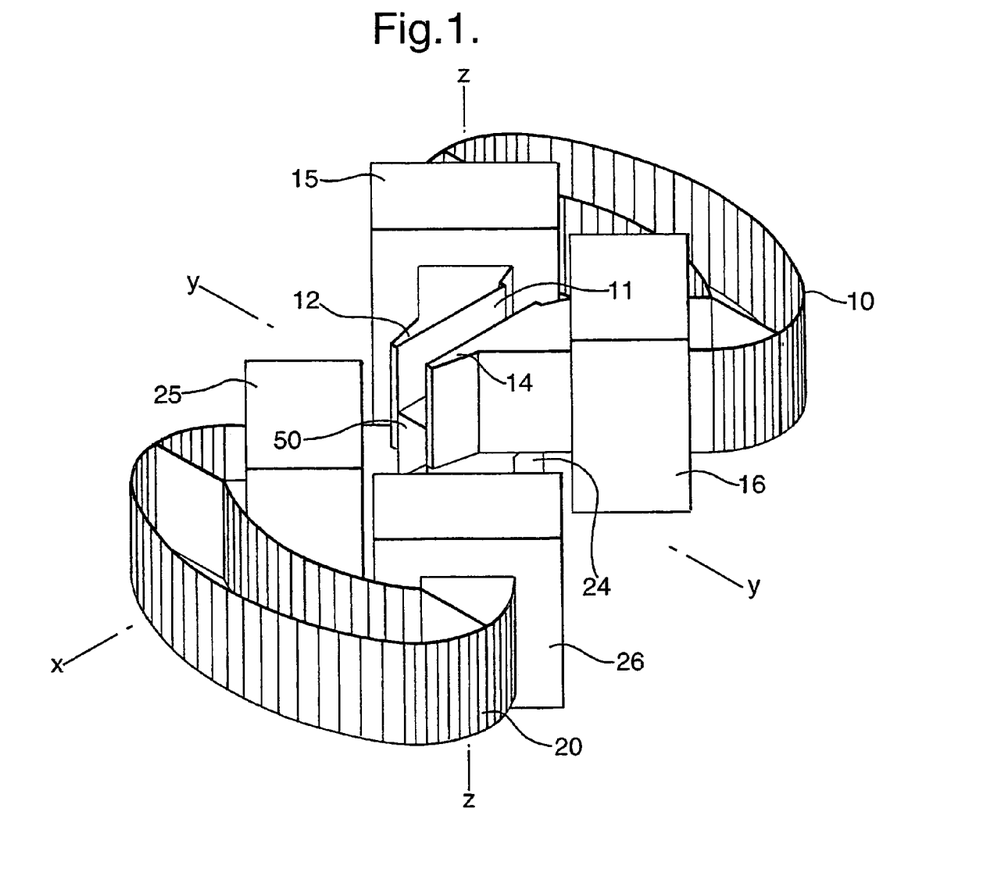
FIG. 1 is a schematic perspective view of a linear electric motor or linear generator.

FIG. 1 shows an electromechanical transducer which may be used either as a linear electric motor or as a linear generator. The apparatus comprises a first core 10 which provides a first magnetic flux path 17 and defines a first air gap 11. More precisely, a first pole piece 12 and a second pole piece 14, both of which are part of the core 10, define between their facing surfaces the air gap 11. The facing surfaces of the preferred embodiments are substantially parallel. All elements of the cores 10, 20 are made of a soft high permeability magnetic material. Preferably the material should have low eddy current and hysteresis losses. Such examples are transformer iron laminations or metal powder composites.

Figure 2:
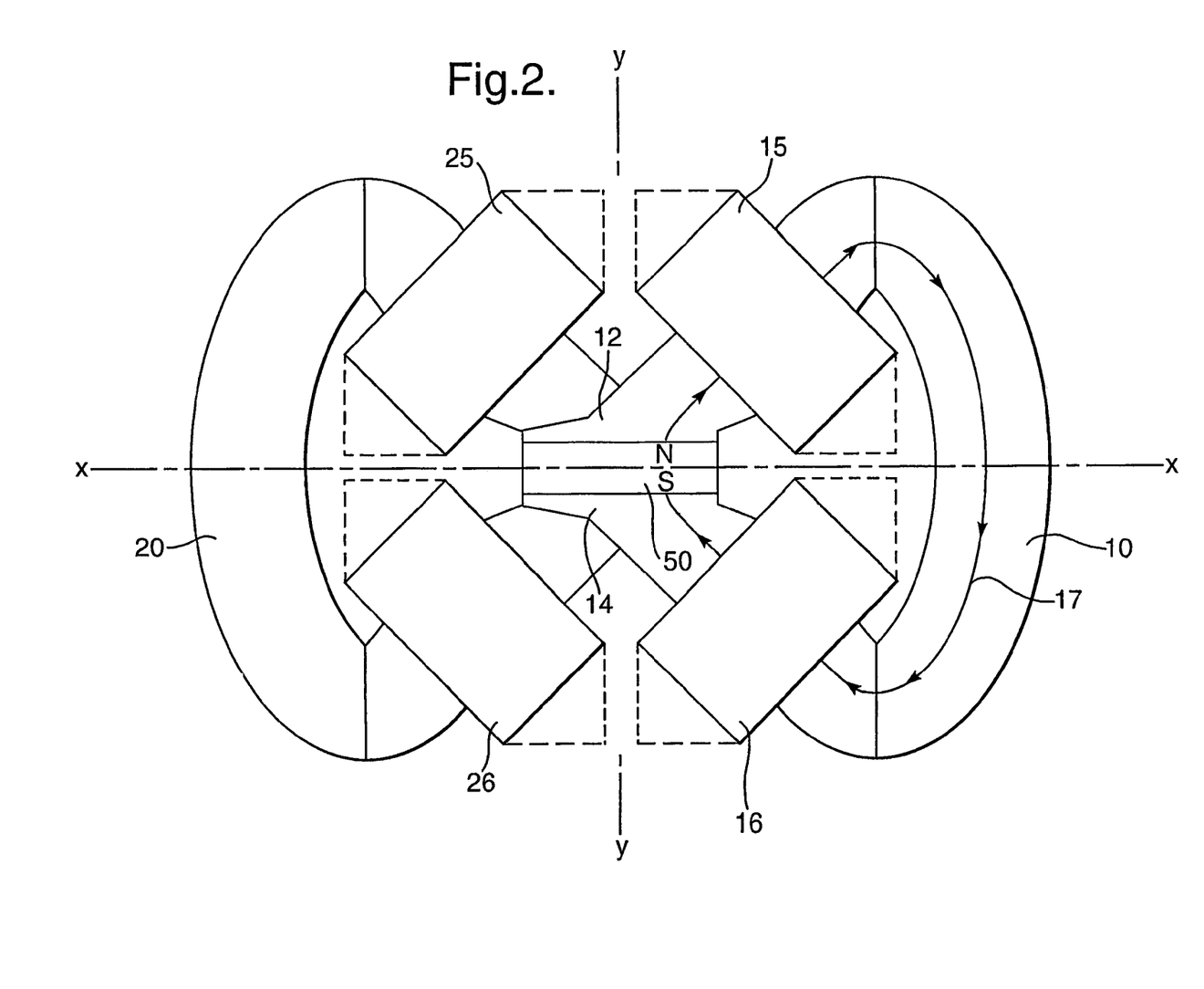
FIG. 2 is a plan view along axis Z of the linear electric motor of FIG. 1.

In the case of laminations, the laminations are formed such that flux entering a lamination at a pole piece 12, 14 stays mainly within that lamination on its path around the core; in FIG. 2 the laminations are in the plane of the paper.

The air gap 11 is dimensioned such that a first armature 50 may be positioned between the surfaces of the pole pieces 12, 14. When the first armature 50 is positioned in the first air gap 11 a first magnetic circuit is completed which comprises the first core 10 (including pole pieces 12, 14) and the first armature 50.

A magnetic field is generated across the first air gap 11 by passing a current through at least one first (electrically conducting) coil 15, 16 which is coiled around a portion of the first core 10. In the embodiment illustrated in FIG. 1 two first coils 15, 16 can be provided surrounding a portion of the core 10. The two first coils 15, 16 are positioned equidistant from the first air gap 11 though this is not necessarily the case. The coils 15, 16, when a current is passed through them, generate a magnetic field between the facing surfaces of the pole pieces 12, 14. That generated magnetic field produces a force on the first armature 50. The force will tend to move the first armature 50 into or out of the air gap 11 depending on the type of armature and its direction of magnetic polarisation.

The cross section of the core 10 is chosen to give acceptable flux densities for the core material. In this design this generally leads to a constant cross section in the core. The cross section may increase locally at the pole pieces to allow lower flux densities in the armature and the air gaps.

A second core 20, also comprising two pole pieces 22, 24, provides a second magnetic flux path and defines a second air gap 21 just like the first core 10. When the first armature 50 is in the second air gap 21, a second magnetic circuit is completed. At least one second coil 25, 26 is coiled around the second core 20. When a current is passed through the at least one second coil 25, 26, a magnetic field is generated across the second air gap 21 for driving the armature 50. In the illustrated embodiment two second coils 25, 26 are illustrated around a portion of the second core 20, equidistant from the pole pieces 22, 24 and thus the second air gap 21. When current is passed through those second electric coils 25, 26, a magnetic field is generated across the second air gap 21. That magnetic field produces a force on the first armature 50. The force will tend to move the first armature 50 into or out of the air gap 21 depending on the type of armature and its direction of magnetic polarisation.

In the embodiment illustrated in FIG. 1 the first armature 50 moves in a longitudinal axis labelled Z. This is the longitudinal axis of the linear motor. It will be appreciated that the longitudinal axis of the motor Z passes through the centre of the armature 50 and that the first and second air gaps 11, 21 are positioned adjacent to one another, in spaced apart relationship and such that the longitudinal axis Z passes through the first and second air gaps 11, 21.

In use, the first armature 50 moves along the longitudinal axis Z from first air gap 11 to second air gap 21 and vice versa This is achieved by arranging for the facing surfaces of the pole pieces 12, 14, 22, 24 to lie substantially parallel to the longitudinal axis Z. Although the air gaps 11, 21 are illustrated with a rectangular shape, the air gaps can be any two dimensional shape extending along the longitudinal axis Z of the motor.

As can be seen in FIG. 2, which is a plan view along the longitudinal axis Z of the linear motor of FIG. 1, a longitudinal plane YZ, (perpendicular to the page as illustrated) in which the longitudinal axis Z lies, provides a line of symmetry for the components forming the first magnetic circuit and the second magnetic circuit. Of course, the first magnetic circuit is positioned above the second magnetic circuit as illustrated. The first coils 15, 16 and the second coils 25, 26 are positioned on opposite sides of the longitudinal plane YZ. This geometry allows the pole pieces 12, 14 of the first core 10 to be positioned close to the pole pieces 22, 24 of the second core 20 as is necessary for them effectively to share a common armature. This is achieved whilst accommodating the bulky coils 15, 16, 25, 26 and maintaining a practical geometry. The resulting apparatus for use in a cryocooler is typically 80 mm in overall diameter, 35 mm long and weighs about 300 g.

The cores 10, 20 of the preferred embodiment are shaped such that the respective flux paths veer away from each other to minimise overlap. The best angle of divergence is about 45° from the centre line because this angle allows most space for the coils 15, 16, 25, 26. The return path taking flux from one coil to the other follows a curve dictated by the necessary cross-section and minimum overall diameter of the electromechanical transducer.

The cores 10, 20, 30, 40 may have any shape so long as the stationary coils 15, 16, 25, 26 may be positioned on opposite sides of a longitudinal plane in which the longitudinal axis Z lies. For example, the cores 10, 20, 30, 40 may be rectangular with an air gap in one of the four sides. In such a case the coils are positioned around the sides of the rectangle, away from the air gap. Because the coils are not stacked one on top of the other, but on opposite sides of the longitudinal plane YZ, the space inside of the cores may be effectively utilised to increase the size of the coils. This would not be possible if the coils were stacked one on top of another. To utilise the space, coils 15, 16, 25, 26 may have a cross section other than rectangular. Changing the shape of the core can also lead to the ability to use larger coils. For example, as can most clearly be seen from FIG. 2, with other shapes of core, there is enough space within the cores to add extra windings (shown dotted) in a triangular cross-section over the basic rectangular shape. To further increase fill factor, the coils may also be wound with flattened wire.

The construction of the linear electric motor is kept simple because the components comprising the first magnetic circuit and those comprising the second magnetic circuit are the same except that those components of the first magnetic circuit are provided on one side of the longitudinal plane YZ and those components of the second magnetic circuit are substantially provided on the second side of the longitudinal plane. In effect, the components of the second magnetic circuit are in a mirror image orientation to the components of the first magnetic circuit. Thus, the first and second cores 10, 20 are positioned such that the first and second flux paths are substantially on opposite sides of and substantially perpendicular to the longitudinal plane YZ. Thus, the two magnetic circuits each have flux paths predominantly in the X Y plane. They alternate about the longitudinal plane YZ such that their flux paths mainly occupy different half cylinders. Of course the similarity of the components making up the flux path allows extra magnetic circuits easily to be added (as described below) thereby increasing the power of the transducer or increasing the length of travel of the armature(s).

The geometry thus allows the two flux paths to be well separated except for a small area around the pole pieces 12, 14, 22, 24. Although pole pieces 12, 14 could actually touch pole pieces 22, 24, in practice a small axial separation is desirable to prevent too much flux from flowing between adjacent cores 10 and 20. Flux leaking in this way reduces the motor force.

As can be seen from FIG. 2 and more particularly from FIG. 3 the first armature 50 has substantially a rectangular cross-section. FIG. 3 is a cross-section taken in the longitudinal plane YZ of the linear electric motor of FIG. 1. As can be seen from FIG. 3, the facing surfaces of the nodes 12, 14, 22, 24 of the first and second cores 10, 20 are substantially parallel to the longitudinal plane. The air gaps 11, 21 are aligned so as to form a passage along the longitudinal axis Z of the motor through which the first armature 50 can move. Therefore, it can be seen that the armature 50 is common to both magnetic circuits.

The clearance between the pole pieces 12, 14 and the first armature 50, when the first armature 50 is in the first gap 11, is an additional air gap in the magnetic circuit The smaller this gap is the less energy is wasted in driving the flux through it and the more efficient the linear electric motor or generator will be. The same is true for the second magnetic circuit. With the planer geometry of the apparatus illustrated in FIG. 1, because of the simplicity, especially of the armature, the components may be manufactured at low cost to high tolerance to make a generator or engine with high efficiency.

A typical clearance between the armature and a pole piece is in the region of 0.25 mm for a 30 W motor.

As can be seen from FIG. 3 the first armature 50 is substantially half the length, in the longitudinal axis, of the distance between the top of the first (upper) air gap 11 and the bottom of the second (lower) air gap 21.

In FIG. 3 the first armature 50 comprises a permanent magnet Thus, the linear electric motor as illustrated is a "flux switching" machine. The magnet is polarised in the Y direction namely in the direction from one surface to the other surface of the pole pieces 12, 14 and is thus in the direction across the first air gap 11. Axial movement in the longitudinal axis Z of the first armature 50 from the first air gap 11 to the second air gap 21, causes the flux of the permanent magnet of the first armature 50 to be switched from the first magnetic circuit of the first core 10 to the second magnetic circuit of the second core 20.

The simple rectangular shape of magnetic material, which is used for the first armature 50 in the permanent magnetic magnet version of the linear electric motor, is easy and cheap to manufacture and to magnetise. The armature may be directly connected to its load and only needs simple suspension means which are described later. Thus the first armature 50 has a low moving mass and simple construction. The armature of this embodiment may also comprise at least one electromagnet with one or more coils and soft iron cores rather than permanent magnets. In such a case, flexible current leads are required to take current into the coils. Electromagnets are likely to be used for larger appliances. The operation of a motor with an electromagnet armature is the same as for a permanent magnet armature.

In operation, coils 15, 16 of the first core 10 are connected to a power source such that current flows and the magnet of the first armature 50 is repelled from core 10. At the same time coils 25, 26 of core 20 are connected to a power source such that current flows and the magnet of the first armature 50 is attracted to core 20. Thus the two circuits combine to produce a force along the longitudinal axis Z. Reversing the direction of the currents produces a force in the opposite direction along the longitudinal axis Z of the linear electric motor. Thus an alternating current through the coils will produce an alternating force that can be used to power, for example, a linear compressor. Typically the linear electric motor will operate at about 75 Hz with a stroke of 10 mm. The engine is about 80% efficient with an output shaft power of about 28 W.

Figure 3A:
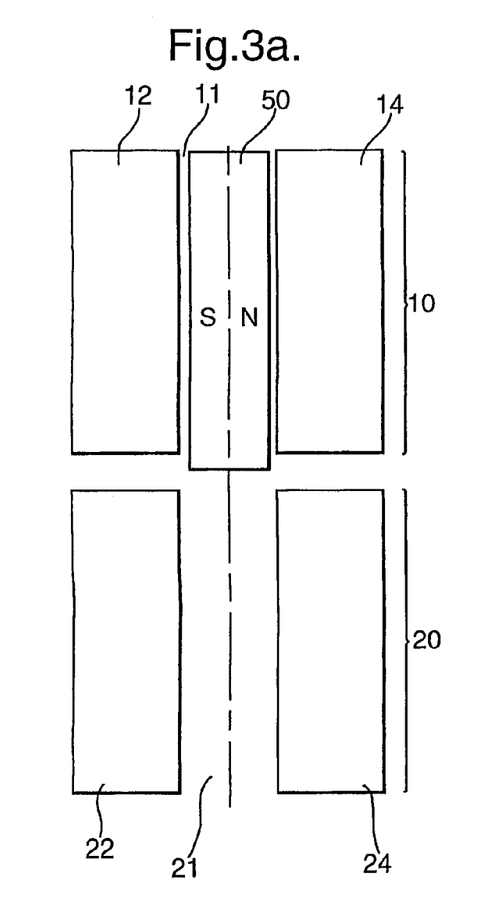
FIG. 3 is a cross-section taken through the plane formed by the Y and Z axes in FIG. 1.
Figure 3B:
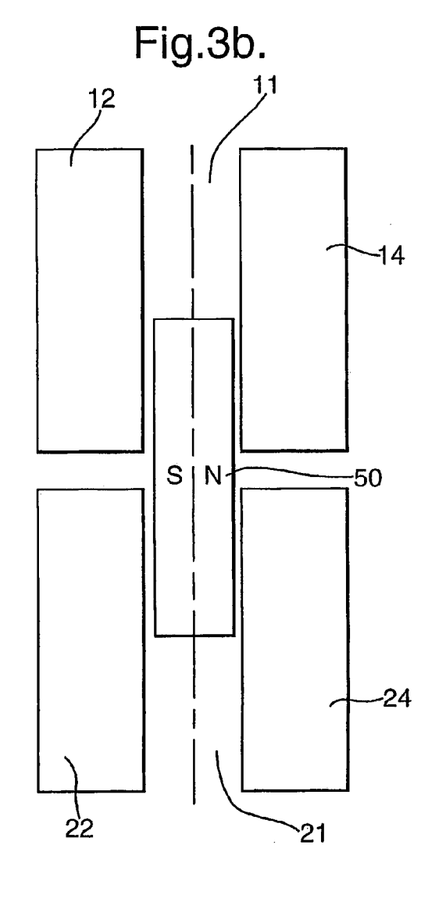
Figure 3C:
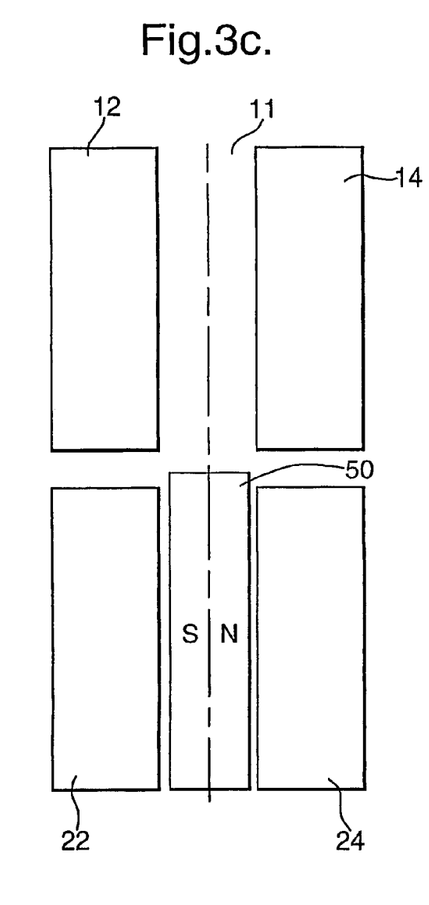
Figure 4:
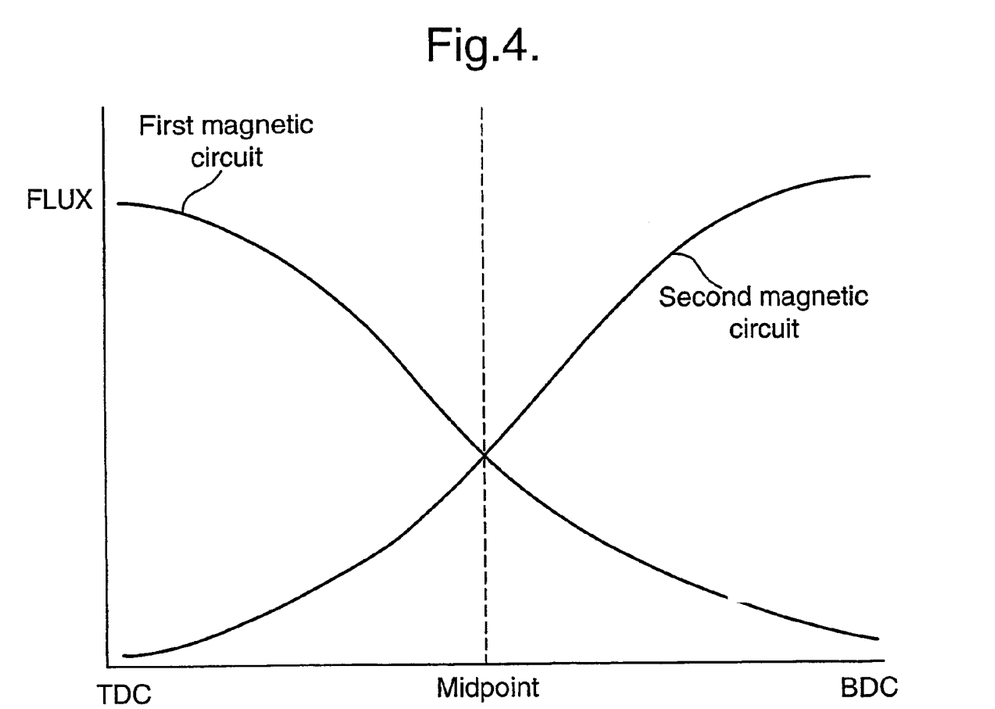
FIG. 4 is a schematic diagram showing the variation in flux levels in the cores of the linear electric motor of FIG. 1 during operation.

FIGS. 3a, b and c show three situations in which the first armature 50 is positioned top dead centre, mid stroke and bottom dead centre respectively. FIG. 4 shows, along the vertical axis, the variation in flux in each magnetic circuit and in the horizontal direction, the position of the magnet of the first armature 50 in the longitudinal axis Z of the motor. As can be seen the flux in the first magnetic circuit which flows around the flux path provided by the first core 10 is a maximum when the first armature 50 is in the top dead centre position whilst the flux in the second circuit which flows around the flux path provided by the second core 20 is in a minimum at this position. In the bottom dead centre position the level of flux in each magnetic circuit is reversed. As the first armature 50 passes through the mid point the level of flux in each magnetic circuit is equal.

The variation of flux with axial position given in FIG. 4 shows the general features to be expected. The rate of flux variation tends to be greatest near the midpoint and diminishes towards top and bottom dead centres. The actual way in which the flux varies can be controlled to some extent by fine tuning of the geometry e.g. by shaping the pole pieces 12, 14 along their axial length so as to give a small variation in the clearance between pole pieces 12, 14 and the first armature 50.

The axial force produced for a given current is proportional to the rate of change of flux and hence to the slope of this curve. Controlling the rate of flux variation can be useful in controlling for instance the generation of unwanted harmonics.

The circuit which drives the linear electric motor when the armature 50 is a permanent or electro-magnet is designed in a conventional way to drive current through coils 15, 16, 25, 26 so as to drive the first armature 50. The coils may be electrically connected together in a variety of ways as determined by the particular embodiment.

The construction of linear electric motor illustrated in FIG. 1 may also be used as a variable reluctance linear electric motor in which the armature 50 is comprised of a soft high permeable material such as iron. Preferably the material should have low eddy current losses and low hysteresis losses e.g. laminated transformer iron.

Thus, when the linear electric motor is used as a variable reluctance motor the armature may be a singular piece of rectangular material with a soft, high permeability. This armature is easy and cheap to manufacture and no magnets are necessary. Such motors can be designed to work in hostile environments, for example, at high temperature.

In the variable reluctance machine the movement of the iron armature 50 varies the reluctance of the two magnetic circuits associated with the first core 10 and the second core 20. With the first armature 50 in the mid position both magnetic circuits have nominally the same reluctance. As the moving member leaves the second air gap 21 and engages more with the first magnetic circuit by entering the first air gap 11, the reluctance of the second magnetic circuit associated with the second core 20 increases and the reluctance of the first magnetic circuit associated with the first core decreases. Reversing the direction of movement reverses reluctance changes in the two circuits.

If the first coils 15, 16 are energised whilst the second coils 25, 26 remain un-energised, a force will be exerted on the soft high permeability first armature 50 in the direction towards the first air gap 11 such that the reluctance of the first magnetic circuit decreases. This force is due to the dependence of gap energy on air gap volume—as the reluctance decreases the gap energy also decreases and work is done on the first armature 50.

If the second magnetic circuit is energised by passing a current through second coils 25, 26 and the coils 15, 16 are switched off, then the force is reversed.

Figure 12:
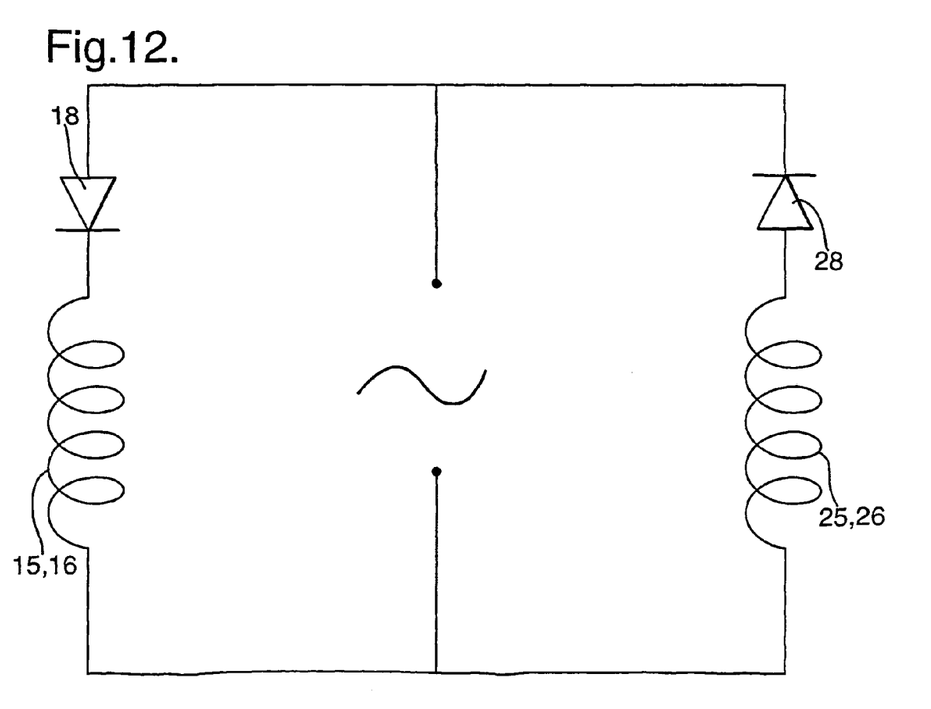
FIG. 12 is a circuit diagram of a simple drive circuit for variable reluctance embodiments of the linear motor of FIG. 1, 5 or 10.

It will thus be seen that if the first and second magnetic circuits are alternately switched on and off then an alternating force is generated on the first armature 50 that can be used to drive a linear compressor. FIG. 12 shows a simple circuit which can achieve this. An alternating current is passed through first coils 15, 16 which are placed in parallel with second coils 25, 26. Coils 15, 16 are placed in series with a first diode 18 whilst second coils 25, 26 are placed in series with a second diode 28. The directions of the first diode 18 and second diode 28 are opposite. Thus, if an alternating voltage is applied, the diodes 18, 28 conduct for alternative half cycles producing an alternating force in the motor. It will be appreciated that there are many different approaches to producing the appropriate switching in the coils 15, 16, 25, 26, which are known in the field of reluctance motors.

If the first armature 50 is comprised of a soft, high permeability magnetic material and the cores 10, 20 and coils 15, 16, 25, 26 are arranged in the way illustrated in FIGS. 1–3 then the apparatus may be used as a variable reluctance generator if an appropriate electronic circuit is synchronised with the movement of moving member. If the armature is made of a permanent magnetic material or electromagnet polarised in the direction as illustrated in FIG. 3 and as described above then movement of the magnet will change the flux through each magnetic circuit and hence the varying flux linkage will generate induced voltages in the coils.

It will be appreciated that several sets of cores 10, 20 and associated coils 15, 16, 25, 26 may be placed in series one after another either to increase the armature force or to increase the travel of the armature 50.

Figure 5:
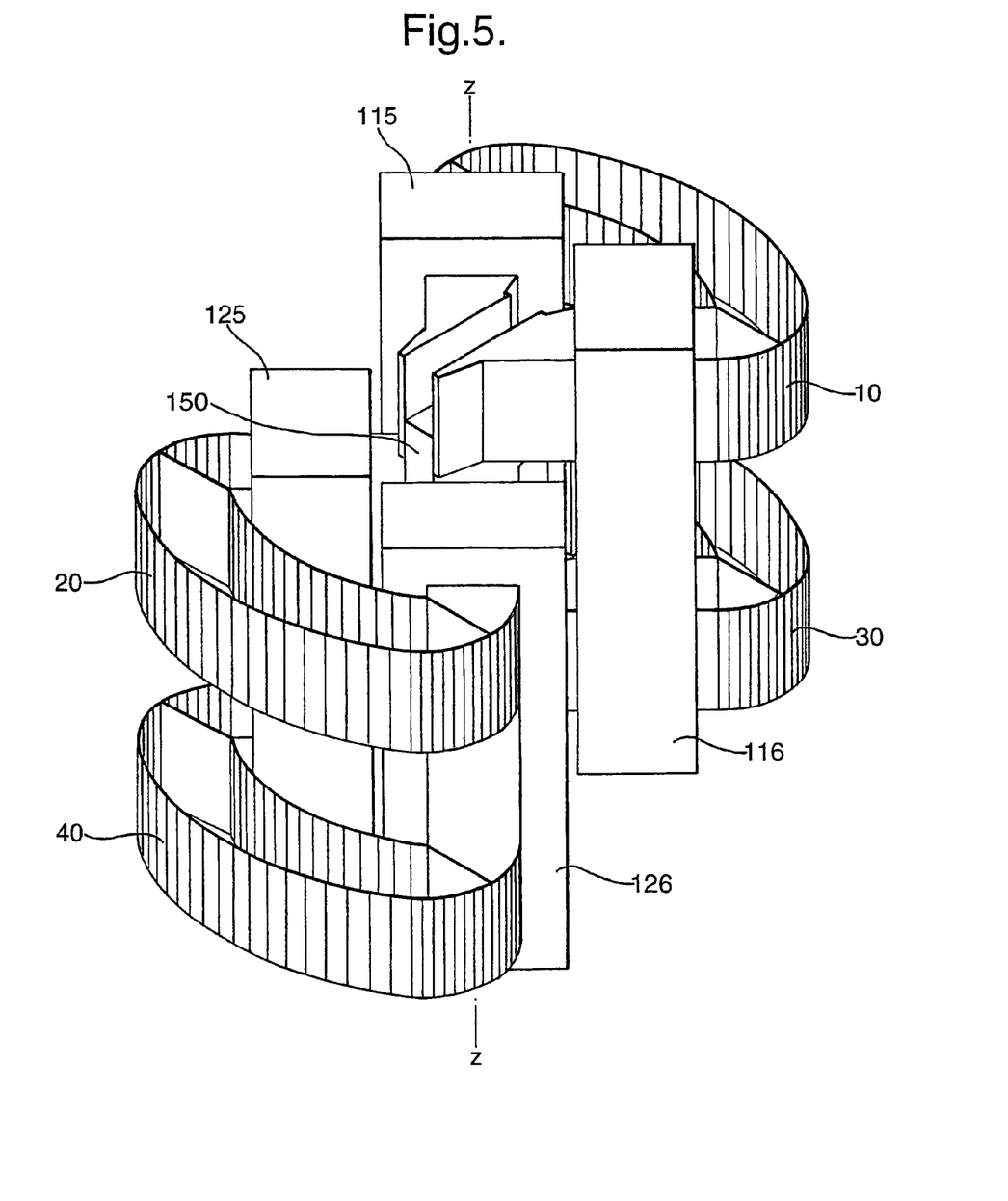
FIG. 5 is a schematic perspective view of a linear electric motor according to a second embodiment.

FIG. 5, shows a embodiment in which the force exerted by the armature 50 is doubled whilst the number of coils 115, 116, 125, 126 remains the same. In this embodiment a third core 30 is positioned underneath (as illustrated) and in the same orientation as the first core 10 and a fourth core 40 is positioned underneath and in the same orientation as the second core 20. The third core 30 and fourth core 40 have the same geometry as the first and second cores 10, 20 and have associated air gaps 31, 41. The cores 10, 20, 30, 40 are positioned such that the first air gap 11 is adjacent to the second air gap 21, that the second air gap 21 is adjacent to the third air gap 31 and that the third air gap 31 is adjacent to the fourth air gap 41.

As can be seen from FIG. 5 only four coils are used and this is achieved by providing the first coils 115, 116 around both the first core 10 and the third core 30. Thus, when a magnetic field is generated across the first air gap 11 a magnetic field is also generated across the third air gap 31. A similar arrangement is used in relation to second core 20 and fourth core 40 in which the second coils 125, 126 are shared. Thus, when the second coils 125, 126 are energised a magnetic field will be generated across the second air gap 21 as well as across the fourth air gap 41. Of course, only two coils are necessary for the functioning of the motor, but any number of coils may be used.

The decision about whether each core should have its own associated coil or to share coils as in FIG. 5 is likely to be determined by consideration of manufacturing cost.

Figure 6A:
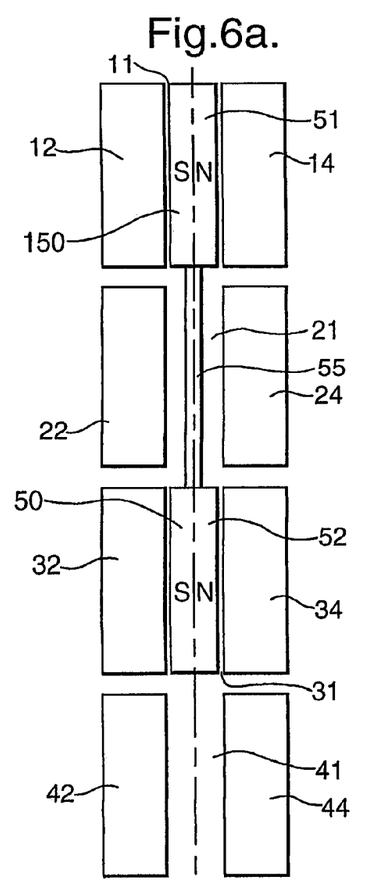
FIG. 6 is a cross section taken through the plane passing through axes Y and Z of the linear electric motor of FIG. 5.
Figure 6B:
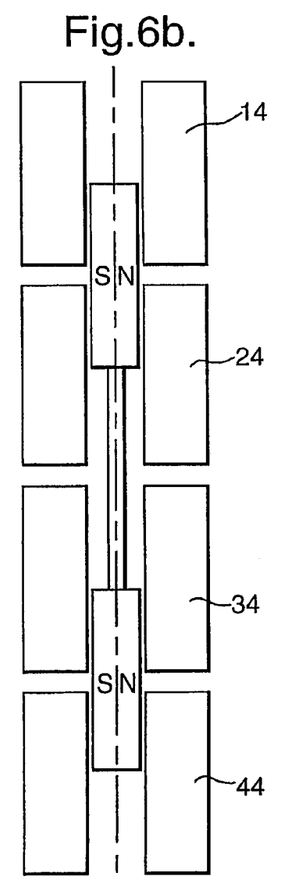
Figure 6C:
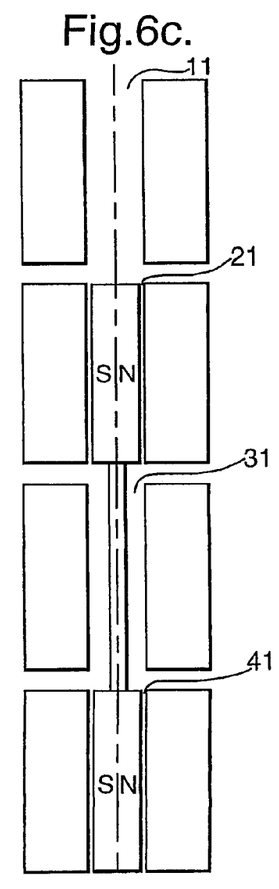

FIG. 6 illustrates the air gaps in the linear motor of FIG. 5. As can be seen, a carriage 150 is comprised of first and second armatures 51, 52 which are magnets (permanent or electromagnet) polarised in the same direction attached together but separated such that the movement of magnet 51 in air gaps 11 and 21 corresponds with the movement of magnet 52 in air gaps 31 and 41. The magnets are connected together by a non-magnetic member 55 comprised of a material such as plastic.

As can be seen, in the top dead centre position the first armature 51 is fully in the first air gap 11 and the second armature 52 is fully in the third air gap 31. Likewise in the bottom dead centre position the armatures 51 and 52 are fully in the second and fourth air gaps respectively. Currents through coils 115, 116, 125, 126 in the appropriate direction cause the armatures 51, 52 to be repelled from air gaps 11, 31 and attracted to air gaps 21, 41 to produce an axial force, the force being the combined forces acting on armatures 51, 52. The force is reversed if the currents are reversed and the general operation is similar to that already described for the basic two core unit of FIG. 1.

It will be understood that the first and second coils 115, 116, 125, 126 could be each positioned around more than two cores or that a combination of separate coils around individual cores and coils around multiple cores could be included in the same linear electric motor.

The embodiment illustrated in FIGS. 5 and 6 are equally applicable to variable reluctance motors as described above in the same way as for the apparatus of FIG. 1 in which use the first and second armatures 51, 52 are made of a soft high permability material. The apparatus of FIG. 5 may be used as a generator with either permanent or electro-magnets in the armatures 51, 52 or with armatures 51, 52 made of a soft high permeability magnetic material.

Figure 7A:
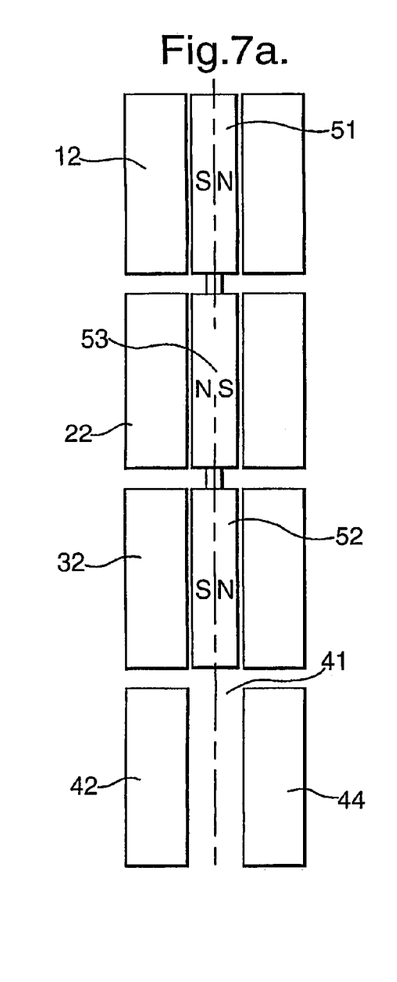
FIG. 7 is a variation on the linear electric motor shown in FIG. 6.
Figure 7B:
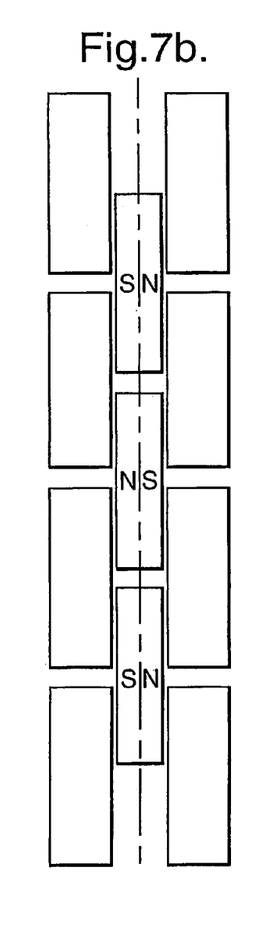
Figure 7C:
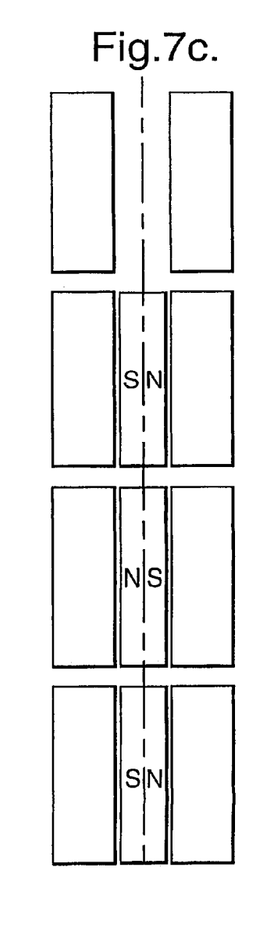

The embodiment illustrated in FIG. 7 is a variation on the embodiment illustrated in FIG. 6. Embodiment illustrated in FIG. 7 only works with flux switching machines in which the armatures are comprised of permanent or electro-magnets. In this embodiment an additional third magnet 53 is incorporated between the first magnet 51 and the second magnet 52 which have the same separation as in the embodiment illustrated in FIG. 6. In the FIG. 7 embodiment the third magnet 53 is polarised in the opposite direction to magnets 51 and 52 such that the change of flux linkage as the armature 50 moves from top dead centre to bottom dead centre is increased for the second and third magnetic circuits associated with the second and third cores 20, 30 respectively. In this way the power handling capacity is increased still further.

It is clear that further units can be added and integrated in a similar way and that the apparatus may also be used as a generator.

Figure 8:
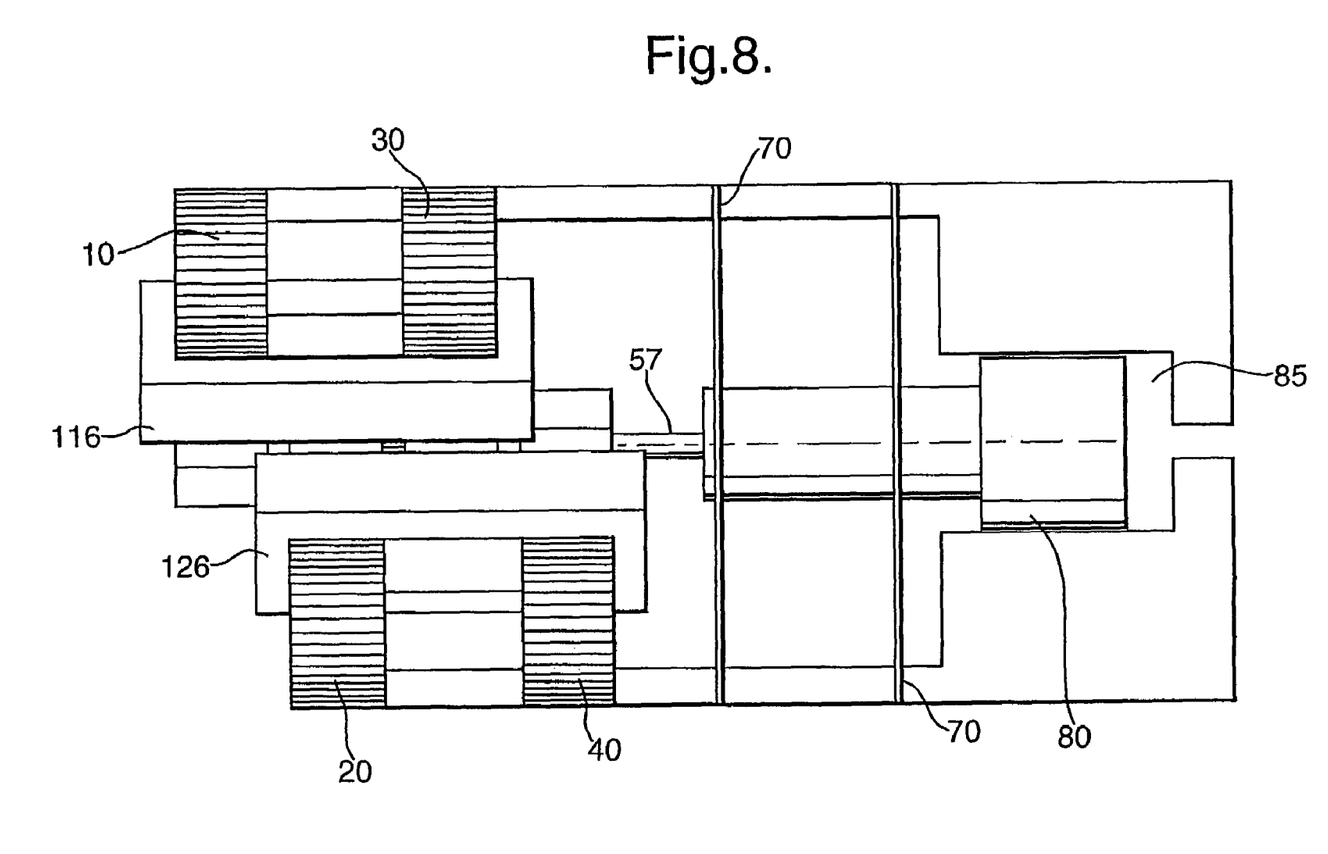
FIG. 8 is a schematic diagram showing a typical application of a linear motor to the drive of a compressor.

FIG. 8 shows a linear motor such as the one illustrated in FIG. 5 attached to a linear compressor comprising a piston 80 in a cylinder 85. The piston 80 is connected to the armature via an attachment means 57. The piston 80, armature and attachment means 57 are mounted on two sets of suspension springs 70. The suspension springs 70 constrain the motion of the piston/armature assembly to an accurate linear motion along the motor/compressor axis. The radial clearance between the piston and cylinder is kept very small so that fluid leakage is acceptably low. This type of seal does not have contacting surfaces and is called a clearance seal. The elimination of any wearing surfaces in this type of machine allows it to achieve long life with oil free operation.

Figure 9:
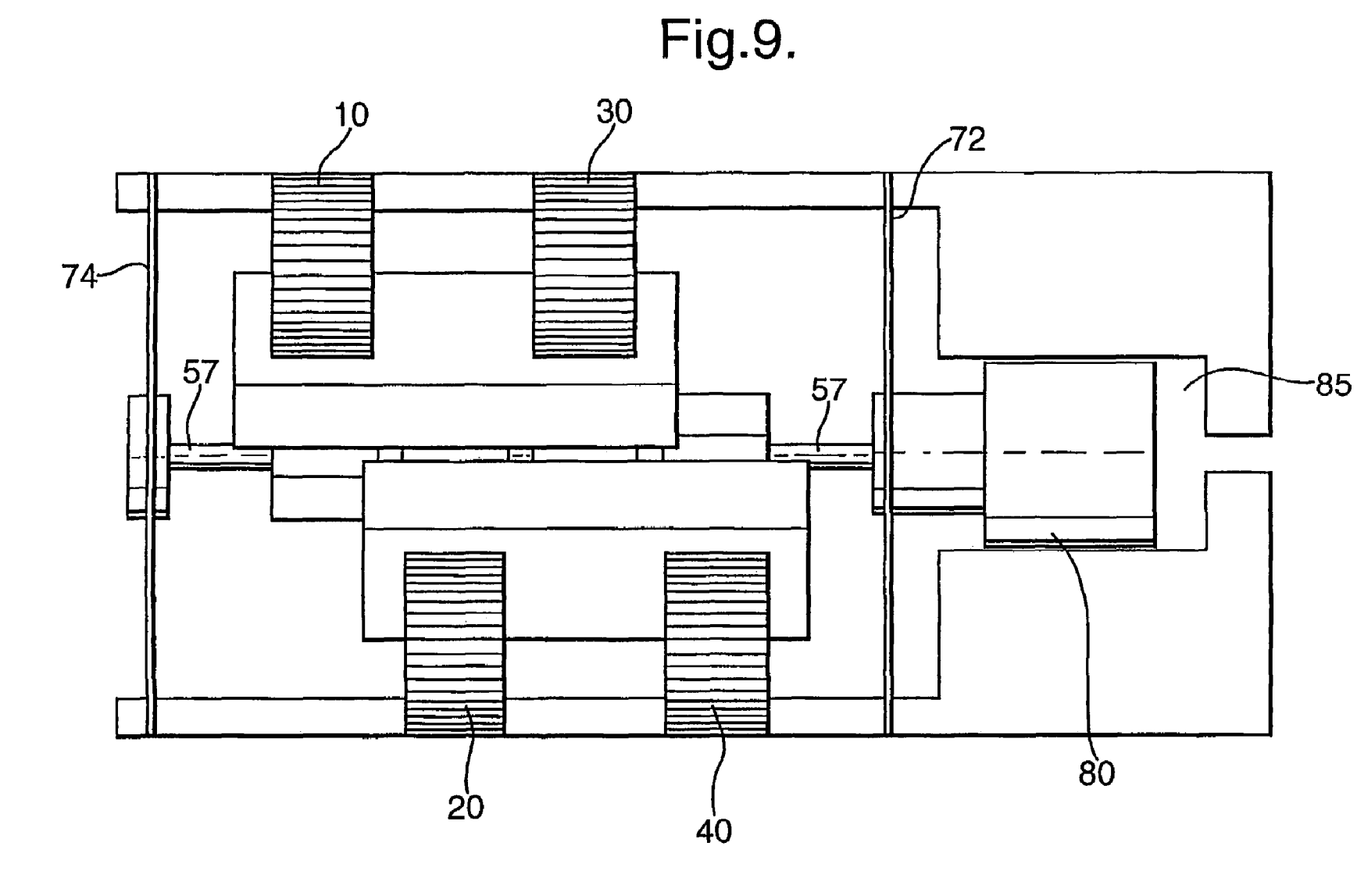
FIG. 9 is a schematic diagram showing a further typical application of a linear motor to the drive of a compressor.

In the embodiment illustrated in FIG. 8, the motor is attached to an end of a self contained compressor assembly whereas in the embodiment of FIG. 9, the armature 50 is mounted between suspension springs 72, 74 to form an integrated compressor and motor. For the embodiment of FIG. 9, the armature also serves as a structural component that connects to two sets of springs together. For this purpose it will be designed to have the required stiffness and strength. These compressors might be valved or valveless compressors, stirling cycle coolers or pulse tube coolers.

Examples of valve compressors which may be driven by the linear electric motors described above are domestic and industrial "Freon" type refrigerators, GM (Gifford McMahon) coolers and oil-free gas compressors. The linear electric motors may also drive pumps, for example, clean circulation system pumps for medical purposes.

In generator mode the apparatus described above may be used in stirling engines.

A particular application of the coolers or refrigerators driven by these linear electric motors are for the cooling of radio communications antennae.

Figure 10:
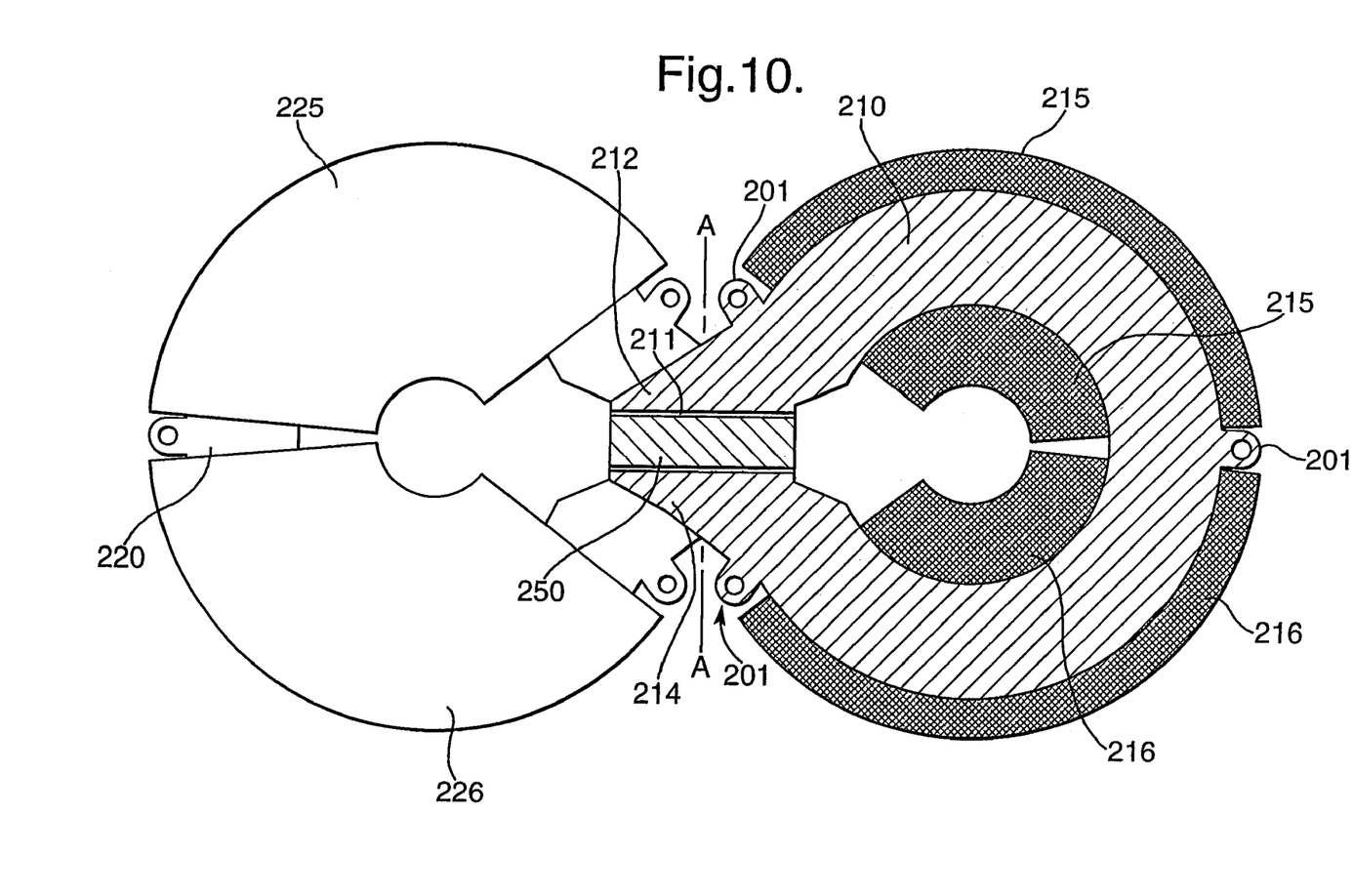
FIG. 10 is a plan view along the longitudinal axis of a further embodiment of the linear electric motor of the present invention.
Figure 11:
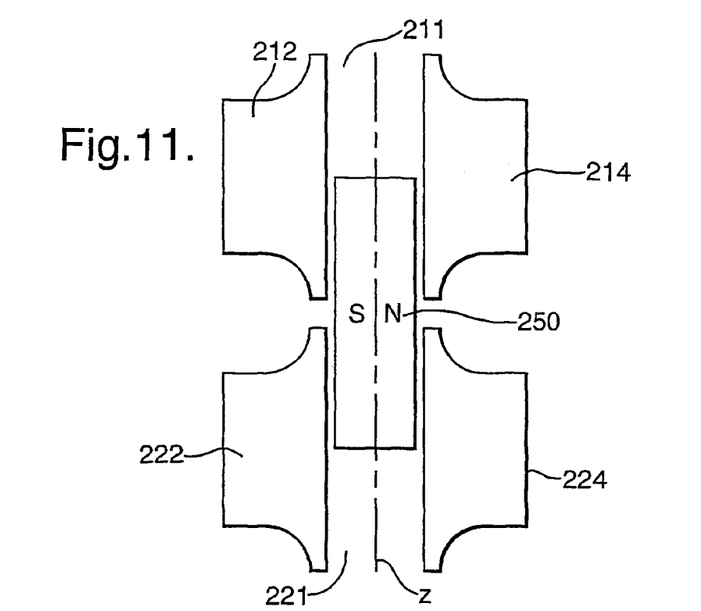
FIG. 11 is a cross-section taken through the plan A—A of FIG. 10.

In the embodiments of FIGS. 1 to 9 the coils are wound on separate formers. Therefore, in order to allow those wound coils to be fitted to the cores, the cores themselves are made of three components so that the coils can be fitted before the cores are assembled. A different design principle in which the number of components is minimised and the amount of materials used is minimised results in a slightly different construction which is illustrated in FIGS. 10 and 11. In this further embodiment the cores 210, 220 are one-piece cores which can be either iron laminations (parallel to the plane of the paper) or made from a soft magnetic composite material.

The coils 215, 216, 225, 226 are then wound around the coils in the same way as the coils of a toroidal transformer are wound. In this way the cores 210, 220 do not need to be split apart in order to fit pre-wound coils. Thus, the motor is of a very simple construction and has few components which, from a manufacturing point of view, is highly attractive.

The one-piece cores of FIG. 10 made of a soft magnetic composite have very low bulk electrical conductivity compared to soft iron laminations. Thus, there is no need to laminate such cores to avoid any current and varying three-dimensional magnetic fields can be used with only minimal eddy current losses thereby allowing more flexibility in design.

With the use of soft magnetic composites the eddy current losses are reduced so that the transducer can be used at higher frequency. Thus, the possibility of the eddy current loss associated with field components in the vicinity of the pole pieces of the embodiments of FIGS. 1 to 7 where the flux spreads itself across the coils (due to the planar field structure) when the core is laminated, is reduced. Those losses, which are acceptable for low frequency applications, can be minimised such that operation at high frequencies is possible.

Of course a number of coils of the FIG. 10 embodiment could be stacked one on top of another in the same way as illustrated in FIG. 6. However, in such a case, it is likely that each core would have its own separate toroidal coil.

Further refinements of the core are also illustrated in FIGS. 10 and 11. Lugs 201 are incorporated in the cores which is one way in which the components could be mounted in a motor. In FIG. 11 it can be seen that the pole pieces 212, 214, 222, 224 have been shaped along the longitudinal axis Z of the motor so as to reduce the leakage between the magnetic circuits whilst retaining the proximity of the actual pole pieces. This is achieved by the greater separation of the cores which results because the pole pieces have a greater dimension in the Z direction than the remainder of the core. Thus, although the pole pieces of different cores are still positioned close together, the remaining part of the cores are positioned further apart thereby achieving lower flux leakage.

I claim:

1. An electromechanical transducer comprising:
   a first core providing a first flux path and defining a first air gap;
   at least one first stationary coil disposed around a portion of said first core;
   a second core providing a second flux path and defining a second air gap;
   at least one second stationary coil disposed around a portion of said second core; and
   a first armature arranged for linear motion along a longitudinal axis through said first and second air gaps; and wherein
   said first and second air gaps are positioned adjacent one another in spaced apart relationship along said longitudinal axis such that said longitudinal axis passes through said first and second air gaps;
   said first and second coils at least partly overlap in the direction of said longitudinal axis;
   said at least one first stationary coil and said at least one second stationary coil are positioned on opposite sides of a longitudinal plane in which said longitudinal axis lies; and
   said first and second cores are positioned such that said first and second flux paths are substantially on opposite sides of said longitudinal plane.

2. An electromechanical transducer according to claim 1, wherein said first and second air gaps are formed between two opposed surfaces of pole pieces of said respective first and second cores.

3. An electromechanical transducer according to claim 2, wherein said opposed surfaces are substantially transverse to said longitudinal plane.

4. An electromechanical transducer according to claim 1, wherein said first and second cores have substantially the same geometry.

5. An electromechanical transducer according to claim 4, wherein said first and second cores are positioned substantially symmetrically to each other with respect to said longitudinal plane.

6. An electromechanical transducer according to claim 1, wherein said first armature has a substantially rectangular cross-section.

7. An electromechanical transducer according to claim 1, wherein said at least one first stationary coil is wound in a toroidal fashion around said first core and said at least one second stationary coil is wound in a toroidal fashion around said second core.

8. An electromechanical transducer according to claim 1, wherein said at least one first stationary coil comprises two stationary coils and said at least one second stationary coil comprises two stationary coils.

9. An electromechanical transducer according to claim 1, wherein said first and second flux paths are generally perpendicular to said longitudinal axis.

10. An electromechanical transducer according to claim 1, wherein said first armature has a length in the direction of said longitudinal axis substantially equal to the length of said air gaps in the direction of said longitudinal axis.

11. An electromechanical transducer according to claim 1, wherein said first and second cores are made from a soft magnetic composite.

12. An electromechanical transducer according to claim 1, wherein said cores have a larger dimension in the direction of said longitudinal axis in proximity to said air gaps than elsewhere.

13. An electromechanical transducer according to claim 1, further comprising:
   a third core for providing a third flux path and for defining a third air gap, wherein said third air gap is positioned adjacent to said second air gap in spaced apart relationship and such that said longitudinal axis passes through said third air gap.

14. An electromechanical transducer according to claim 13, wherein said at least one first stationary coil is disposed around a portion of said third core for generating a magnetic field across said third air gap.

15. An electromechanical transducer according to claim 13, further comprising a fourth core for providing a fourth flux path and for defining a fourth air gap; wherein
   said fourth air gap is positioned adjacent to said third air gap in spaced apart relationship and such that said longitudinal axis passes through said fourth air gap.

16. An electromechanical transducer according to claim 15, wherein said at least one second stationary coil is disposed around a portion of said fourth core for generating a magnetic field across said fourth air gap.

17. An electromechanical transducer according to claim 13, further comprising a carriage arranged for linear motion along said longitudinal axis through said first and second air gaps and which comprises said first armature and a second armature, said armatures being separated by approximately the length of said second air gap in the direction of said longitudinal axis.

18. An electromechanical transducer according to claim 17, wherein said first and second armatures are magnets both polarised in a direction substantially perpendicular to said longitudinal axis.

19. An electromechanical transducer according to claim 18, wherein said carriage comprises a third armature which is a magnet, said third magnet being polarised in the opposite direction to said first and second armatures and positioned between said first and second armatures.

20. An electromechanical transducer according to claim 1, wherein said first armature comprises a magnet.

21. An electromechanical transducer according to claim 20, wherein said magnet is a permanent magnet which is polarised in a direction substantially perpendicular to said longitudinal axis.

22. An electromechanical transducer according to claim 20, wherein said magnet comprises at least one electromagnet with one or more coils and soft iron cores polarisable in a direction substantially perpendicular to said longitudinal axis.

23. An electromechanical transducer according to claim 17, wherein said first and second armatures are comprised of a soft high magnetically permeable material.

24. An electromechanical transducer according to claim 1, wherein said first armature is comprised of a soft high magnetically permeable material.

25. An electromechanical transducer according to claim 1, arranged to operate as a linear electric motor, wherein said at least one first and second stationary coils are for generating magnetic fields across said first and second air gaps respectively and said first armature is arranged for linear motion in response to said generated magnetic fields.

26. An electromechanical transducer according to claim 25, further comprising an electric circuit for generating current in said at least one first stationary coil and said at least one second stationary coil.

27. An electromechanical transducer according to claim 1, arranged to operate as a linear electric generator.

28. A linear compressor comprising a linear electric motor according to claim 25.

29. A linear compressor according to claim 28, further comprising a piston connected at an end of said first armature.

30. A linear compressor according to claim 28, further comprising suspension springs for suspending said first armature in said air gaps.

31. A refrigerator comprising a linear compressor of claim 28.

32. A radio communications antenna comprising a refrigerator of claim 31.

* * * * *